(12) United States Patent
Kalos et al.

(10) Patent No.: US 7,836,204 B2
(45) Date of Patent: Nov. 16, 2010

(54) APPARATUS, SYSTEM, AND METHOD FOR ACCESSING A PREFERRED PATH THROUGH A STORAGE CONTROLLER

(75) Inventors: Matthew Joseph Kalos, Tucson, AZ (US); Richard Anthony Ripberger, Tucson, AZ (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 11/142,018

(22) Filed: Jun. 1, 2005

(65) Prior Publication Data

US 2006/0277310 A1 Dec. 7, 2006

(51) Int. Cl.
G06F 15/173 (2006.01)
(52) U.S. Cl. .................................................. 709/239
(58) Field of Classification Search ................. 709/217, 709/239
See application file for complete search history.

(56) References Cited

U.S. PATENT DOCUMENTS

| | | | |
|---|---|---|---|
| 6,286,074 B1 * | 9/2001 | Batchelor et al. ........... 710/305 |
| 6,738,839 B2 * | 5/2004 | Sinha ........................... 710/39 |
| 6,883,108 B2 * | 4/2005 | Lee et al. ........................ 714/4 |
| 2002/0087822 A1 * | 7/2002 | Butterworth ................. 711/170 |
| 2004/0128363 A1 * | 7/2004 | Yamagami et al. .......... 709/217 |
| 2005/0071721 A1 * | 3/2005 | Butt et al. .................... 714/742 |
| 2005/0251548 A1 * | 11/2005 | Hayashi et al. ............. 709/200 |

* cited by examiner

Primary Examiner—Jeffrey Pwu
Assistant Examiner—Scott M Sciacca
(74) Attorney, Agent, or Firm—Kunzler Needham Massey & Thorpe

(57) ABSTRACT

An apparatus, system, and method are disclosed for accessing a preferred path through a storage controller. A request module receives a request from a host to identify a preferred path from the host to a control unit image. A response module reports the preferred path to the host. A connection module connects the host through the preferred path to the control unit image. In one embodiment, a detection module detects a failure of a first interconnection module comprising the preferred path. The connection module may re-connect the host to the control unit image through a non-preferred path comprising a second interconnection module in response to the failure of the first interconnection module.

20 Claims, 5 Drawing Sheets

APPARATUS, SYSTEM, AND METHOD FOR ACCESSING A PREFERRED PATH THROUGH A STORAGE CONTROLLER

BACKGROUND OF THE INVENTION

1. Field of the Invention

This invention relates to accessing a path and more particularly relates to accessing a preferred path through a storage controller.

2. Description of the Related Art

A storage controller is typically employed to connect one or more hosts such as servers, mainframe computers, and the like with one or more storage devices such as hard disk drives, magnetic tape drives, optical storage drives, and the like. The storage controller includes an interconnection module. The interconnection module includes one or more host ports each configured to connect through a first communication channel to the host. In addition, the interconnection module also includes one or more logical devices. Each logical device may emulate a storage device such as a hard disk drive and the like. In addition, each logical device may be comprised of portions of one or more storage devices. The host may connect to and access the logical device through the interconnection module.

The storage controller may include a plurality of redundant interconnection modules. Each interconnection module may connect the host to the logical device. Thus if a first interconnection module fails a second interconnection module may allow the host to connect to the logical device with minimal or no interruption. Each interconnection module may communicate through an internal communication channel with at least one other interconnection module.

The host may request a path to the logical device and be assigned one of the available paths. For example, the host may connect to the logical device through the first interconnection module, the internal communication channel between the first and the second interconnection module, and from the second interconnection module to the logical device. Unfortunately, such a connection between the host and the logical device may have significantly lower performance than a preferred path such as a connection directly from the host through the first interconnection module to the logical device.

From the foregoing discussion, it should be apparent that a need exists for an apparatus, system, and method that connect a host to a logical device through a preferred path. Beneficially, such an apparatus, system, and method would improve the performance of communications between the host and the logical device.

SUMMARY OF THE INVENTION

The present invention has been developed in response to the present state of the art, and in particular, in response to the problems and needs in the art that have not yet been fully solved by currently available methods of accessing a path between a host and a storage device. Accordingly, the present invention has been developed to provide an apparatus, system, and method for accessing a path that overcome many or all of the above-discussed shortcomings in the art.

A system of the present invention is presented to access a path. The system may be embodied in a storage array. In particular, the system, in one embodiment, includes a host, a storage controller comprising a plurality of redundant interconnection modules, one or more control unit image ("CUI") with one or more logical devices that are emulated by the storage controller, a request module, a response module, a detection module, and a connection module.

The host may be a server, a mainframe computer, or the like. The host accesses data stored on one or more logical devices through the storage controller. The storage controller provides for the emulation of one or more logical devices. Each logical device appears to the attached host as a storage device, but the emulation may virtualize the storage capacity provided by the storage devices attached to the storage controller to provision the capacity for the logical device. The logical device's capacity may reside on one or more storage devices, each of which may be a disk, an array of disks, or another such physical storage device. The management of a given logical device maybe performed within a single interconnection module at any given time such that a host that wishes to communicate with that logical device must communicate with the managing interconnection unit. The interconnection modules are redundant in the sense that the failure of one interconnection module causes the management of the logical devices on that interconnection module to be transferred to one of the remaining interconnection modules.

Certain communication paths between the host and the storage controller may provide a more direct path to a given interconnection unit. For instance, the physical communication paths between the host and the storage controller may physically reside on a given interconnection module. In this case, access to a given interconnection module is direct when accessing communication paths on that interconnection module and indirect when accessing other communication paths on other interconnection modules. In another instance, a physical communication path may provide the ability to communicate with more than one interconnection module, but the communication through the set of physical paths on the storage controller may operate more efficiently such as with better bandwidth if communications for specific interconnection modules are directed through specific physical paths.

A request module associated with a logical device receives a request from a host to identify a plurality of communication paths to be used when the host is communicating with that logical device. In one embodiment, a group of up to 256 logical devices are aggregated into a CUI wherein the CUI functions as a management group for the logical devices. For simplicity, a given CUI can be managed by a given interconnection module such that the communication paths which are best suited for communication with that interconnection module are also the communication paths that are best suited for communication with all the logical devices on that CUI. As such, the response provided by the response module of any logical device on a CUI identifies the plurality of communication paths including one or more preferred paths. This reduces the amount of preferred path information that must be communicated between the host and the logical devices as the preferred path information obtained from one logical device on a CUI applies to all logical devices on the CUI.

An apparatus to access a path is also presented. The apparatus is provided with a logic unit containing a plurality of modules configured to functionally execute the necessary steps of receiving a request, reporting a path, and connecting through a preferred path. These modules in the described embodiments include a request module, a response module, and a connection module.

The response module reports each path to the host. In addition, the response module reports each path's status relative to the CUI to the host. In one embodiment, the preferred path is any path from the host to the CUI that meets a specified performance requirement. In an alternate embodiment the preferred path is any path from the host to the CUI that meets a specified routing requirement. In a certain embodiment, the preferred path is the available path configured for the best communication performance.

The connection module connects the host through a preferred path to the CUI. In one embodiment, the connection module connects the host in response to a request from the host. In an alternate embodiment, the connection module connects the host to the CUI through the preferred path in response to receiving the preferred path identifier from the response module. The apparatus connects the host to the CUI through a preferred path, improving the communications performance between the host and the CUI.

A method of the present invention is also presented for accessing a path. The method in the disclosed embodiments substantially includes the steps necessary to carry out the functions presented above with respect to the operation of the described apparatus and system. In one embodiment, the method includes receiving a request, reporting a plurality of paths, and connecting through a preferred path.

A request module receives a request from a host to identify a plurality of paths from the host to a CUI. A response module reports each path and each path's status relative to the CUI to the host. A connection module connects the host through the preferred path to the CUI. In one embodiment, a detection module detects a failure of a first interconnection module comprising the preferred path. The connection module may re-connect the host to the CUI through a non-preferred path in response to the failure of the first interconnection module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention identifies a plurality of paths to a CUI in response to a host request. In addition, the present invention connects the host to the CUI through a preferred path. The present invention improves the performance of communication between the host and the CUI by allowing the host to access the CUI through the preferred path. These features and advantages of the present invention will become more fully apparent from the car following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
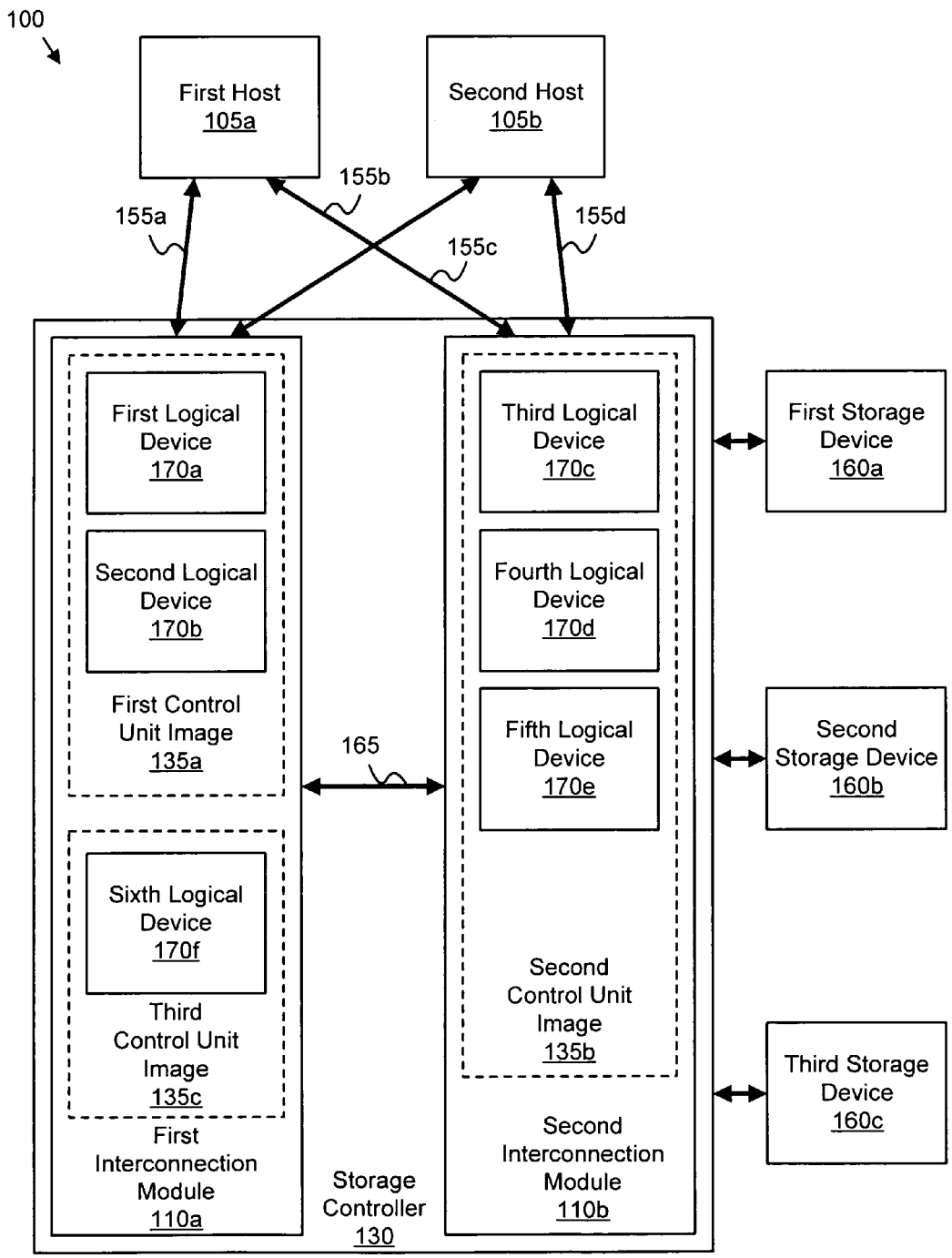
FIG. 1 is a schematic block diagram illustrating one embodiment of a path access system in accordance with the present invention.

Many of the functional units described in this specification have been labeled as modules, in order to more particularly emphasize their implementation independence. For example, a module maybe implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. Where a module or portions of a module are implemented in software, the software portions are stored on one of more computer readable storage media. A computer readable storage media may take any form capable of storing machine-readable instructions executable on a digital processing apparatus.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a path access system 100 of the present invention. The system 100 includes one or more hosts 105, a storage controller 130 comprising one or more interconnection modules 110 and one or more CUIs 135, and one or more storage devices 160. Each CUI 135 is a virtual module emulated by the storage controller 130. In addition, each CUI 135 is depicted with one or more logical devices 170. Although the system 100 is depicted with two interconnection modules 110, three CUIs 135, six logical devices 170, and three storage devices 160, any number of interconnection modules 110, CUIs 135, logical devices 170, and storage devices may be employed.

The host 105 may be a server, a mainframe computer, or the like. In one embodiment, the host 105 is a zSeries mainframe such as a z/390 manufactured by International Business Machines Corporation ("IBM") of Armonk, N.Y. The host 105 accesses data stored on the logical devices 170 through the storage controller 130. Each logical device 170 may emulate a storage device 160 such as a hard disk drive, an optical storage device, a magnetic tape drive, or the like. In addition, each logical device 170 may comprise portions of one or more storage devices 160. In one embodiment, the storage controller 130 is configured as a redundant array of independent disk ("RAID") controller. In an alternate embodiment, the storage controller 130 is configured as a data cache. In a certain embodiment, the storage controller 130 is a DS/8000 or DS/6000 storage facility manufactured by IBM of Armonk, N.Y.

The storage controller 130 organizes the logical devices 170 as one or more CUIs 135. The CUI 135 is a management group. In one embodiment, a CUI 135 comprises up to two hundred and fifty-six (256) logical devices 170. For example, the first CUI 135a is depicted as comprising the first logical device 170a and the second logical device 170b. Each logical device 170 virtualizes one or more storage devices 160 such as hard disk drives, optical storage devices, and the like.

The interconnection module 110 manages one or more CUIs 135. The host 105 stores data to and retrieves data from the logical device 170 through the interconnection module 110. Each interconnection module 110 may manage each CUI 135. For example, the first interconnection module 110a is depicted as managing the first and third CUI 135a, 135c. If the first interconnection module 110a fails, the management of the first and third CUI 135a, 135c may be transferred to the second interconnection module 110b.

The host 105 accesses the logical device 170 through a path. The path may comprise one or more communication channels. In the depicted embodiment, the path includes one or more host communication channels 155 between the first and second host 105a, 105b and the storage controller 130.

The host communication channel 155 maybe a network connection or the like. The path also includes one or more interconnection modules 110 of the storage controller 130. Each interconnection module 110 may be configured with a plurality of host ports for connecting to the host communication channel 155. Thus the first host 105a may communicate with the first logical device 170a of the first CUI 135a through a host port, the first host communication channel 155a, and the first interconnection module 110a.

Each interconnection module 110 is redundant and may perform the interconnection function of at least one other interconnection module 110. In addition, each interconnection module 110 may communicate with at least one other interconnection module 110 through an internal communication channel 165. The internal communication channel 165 may be a digital electrical signal bus or the like. Thus if the first interconnection module 110a fails, the functions of the first interconnection module 110a may be performed by the second interconnection module 110b.

For example, the first host 105a may communicate with the third logical device 170c of the second CUI 135b through a first path comprising the second host communication channel 155b, and the second interconnection module 110b. If the second host communication channel 155b fails, the first host 105a may continue to communicate with the third logical device 170c through a second path including the first host communication channel 155a, the first interconnection module 110a, and the internal communication channel 165. If the second interconnection module 110b fails, management of the second CUI 135b and the third, fourth, and fifth logical devices 170c, 170d, 170e are transferred to the first interconnection module 110a and the first host 105a may continue to communicate with the third, fourth, and fifth logical devices 170c, 170d, 170e through the second path including the first host communication channel 155a and the first interconnection module 110a.

Both the first path and the second path are viable paths for connecting the first host 105a and the third logical device 170c. Each path may provide a different level of communications performance for communications between the first host 105a and the third logical device 170c. For example, because the second path includes the internal communication channel 165, the second path may have lower communications performance than the first path. Unfortunately, because each path between a host 105 and a CUI 135 is valid, the host 105 may connect to the CUI 135 through a path with lower communications performance. The present invention supports the host 105 accessing the CUI 135 through a preferred path such as a higher communications performance path.

The storage controller 130 receives a request from the host 105 to identify a plurality of host communication paths 155 from the host 105 to the CUI 135. The storage controller 130 reports each path to the host 105 and the status of the path. The status identifies each host communication path 155 as preferred or non-preferred. In one embodiment, the status identifies if the path is available. For example, the first host 105a may communicate a request to the storage controller 130 for paths to the first CUI 135a and the storage controller 130 may report one or more paths including a path with a preferred status or preferred path comprising the first host communication channel 155a and a path with non-preferred status or non-preferred path comprising the second host communication channel 155b. This provides sufficient information to allow the host 105 to direct I/O requests for logical devices 170 on a given CUI 135 to the storage controller 130 through communication paths 155 that are preferred for that CUI 135. The host 105 typically connects to the storage controller 130 through all available paths but I/O requests for a given CUI 135 are directed through the preferred paths as long as they are available. A given communication path may be preferred for certain CUIs 135 and non-preferred for other CUIs 135.

Figure 2:
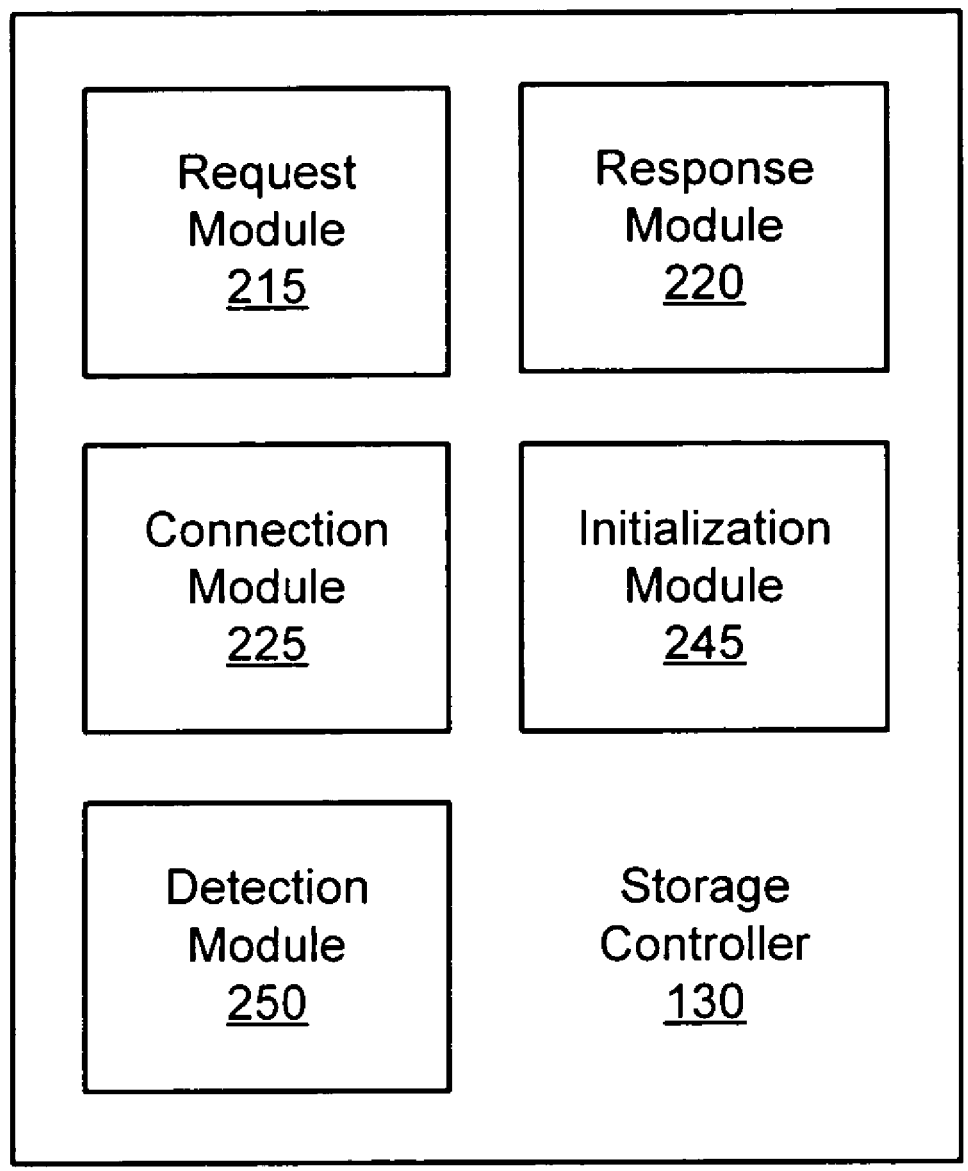
FIG. 2 is a schematic block diagram illustrating one embodiment of a storage controller of the present invention.

FIG. 2 is a schematic block diagram illustrating one embodiment of a storage controller 130 as depicted in FIG. 1 in accordance with the present invention. The storage controller 130 includes a request module 215, a response module 220, a connection module 225, an initialization module 245, and a detection module 250.

The request module 215 receives a request from a host 105 to identify one or more paths to a CUI 135 such as the CUI 135 of FIG. 1. In one embodiment, the request is for all paths to a specified CUI 135. In an alternate embodiment, the request is for all CUIs 135 relative to a specified path where the status of the specified path is provide for each CUI 135.

In one embodiment, a host port identifier uniquely identifies each port on the storage controller 130 where a host communication channel 155 can be attached. For example, a host port may be identified by the port identifier eight (8) and may be associated with a first interconnection module 10a. This host port identifier is provided in the response to a request for preferred path information such that it identifies the host communication path 155 that the request was made over. Additionally, the preferred or non-preferred status of each path is associated with a host port identifier such that the host 105 can make the association between host communication paths 155 the host 105 is attached to and the path status information provided in the report.

The response module 220 reports one or more paths to the host 105. In addition, the response module 220 reports the status of each path. In a certain embodiment, a path may have a preferred status or a non-preferred status. In one embodiment, a path with a preferred status or preferred path is any path from the host 105 to the CUI 135 that meets a specified performance requirement. For example, the preferred path may meet a performance requirement such as a minimum latency time interval or the like. In an alternate embodiment the preferred path is any path from the host to the CUI that meets a specified routing requirement. For example, the preferred path may be a path that does not include an internal communication channel 165. In a certain embodiment, the preferred path is the available path configured for the best communication performance.

The specified path may be a host port. For example, the request module 215 may receive a request for a specified host port. The response module 220 may report that the path specified by the host port is available and preferred for a specified CUI 135. Alternatively, the response module 220 may report that the host port specifies a path that is available and non-preferred for the specified CUI 135. In addition, the response module 220 may report that the path is not available for the specified CUI 135.

In an alternate embodiment, the response module 220 reports the preference status of one or more paths. For example, the response module 220 may report each path associated with a specified CUI 135 and the preference status of each path. The response module 220 may report that a path is available and preferred for the specified CUI 135. Alternatively, the response module 220 may report that a path is available and non-preferred for the specified CUI 135.

The connection module 225 connects the host 105 through the preferred path to the CUI 135. In one embodiment, the connection module 225 connects the host 105 in response to a request from the host 105. For example, the host 105 may receive a host port identifier with a preferred preference status from the response module 220. The host 105 may request that the connection module 225 connect the host 105 to the CUI 135 through the host port.

In an alternate embodiment, the connection module 225 connects the host 105 to the CUI 135 through the preferred path in response to receiving the preferred path identifier from the response module 220. For example, the response module 220 may communicate the preferred path to the host 105 and the connection module 225. The connection module 225 may connect the host 105 to the CUI 135 in response to receiving the preferred path.

In one embodiment, the initialization module 245 identifies the preferred path when the storage controller 130 is initialized. For example, during initialization, the initialization module 245 may identify a preferred path for the first CUI 135a comprising the first host connection path 155 a and the first interconnection module 110a, a non-preferred path for the first CUI 135a comprising the second host connection path 155b, the second interconnection module 110b, the internal communication path 165, and the first interconnection module 110a, and a preferred path for the second CUI 135b comprising the fourth host connection path 155d and the second interconnection module 110b, and a non-preferred path for the second CUI 135b comprising the third host connection path 155c, the first interconnection module 110a, the internal communication path 165, and the second interconnection module 110b.

In one embodiment, the detection module 250 detects a failure of an interconnection module 110. The detection module 250 may communicate the failure detection to the connection module 225 and the connection module 225 re-connect the host 105 to the CUI 135 through an alternate path. The alternate path may be a non-preferred path. For example, the first host 105a may connect to the first CUI 135a through the first interconnection module 110a. The detection module 250 may detect a failure of the first interconnection module 110a. The connection module 225 may re-connect the first host 105a to the first CUI 135a through the second interconnection module 110b and the internal communication channel 165 in response to the failure detection. The storage controller 130 connects the host 105 to the CUI 135 through a preferred path, improving the communications performance between the host 105 and the CUI 135.

Figure 3:
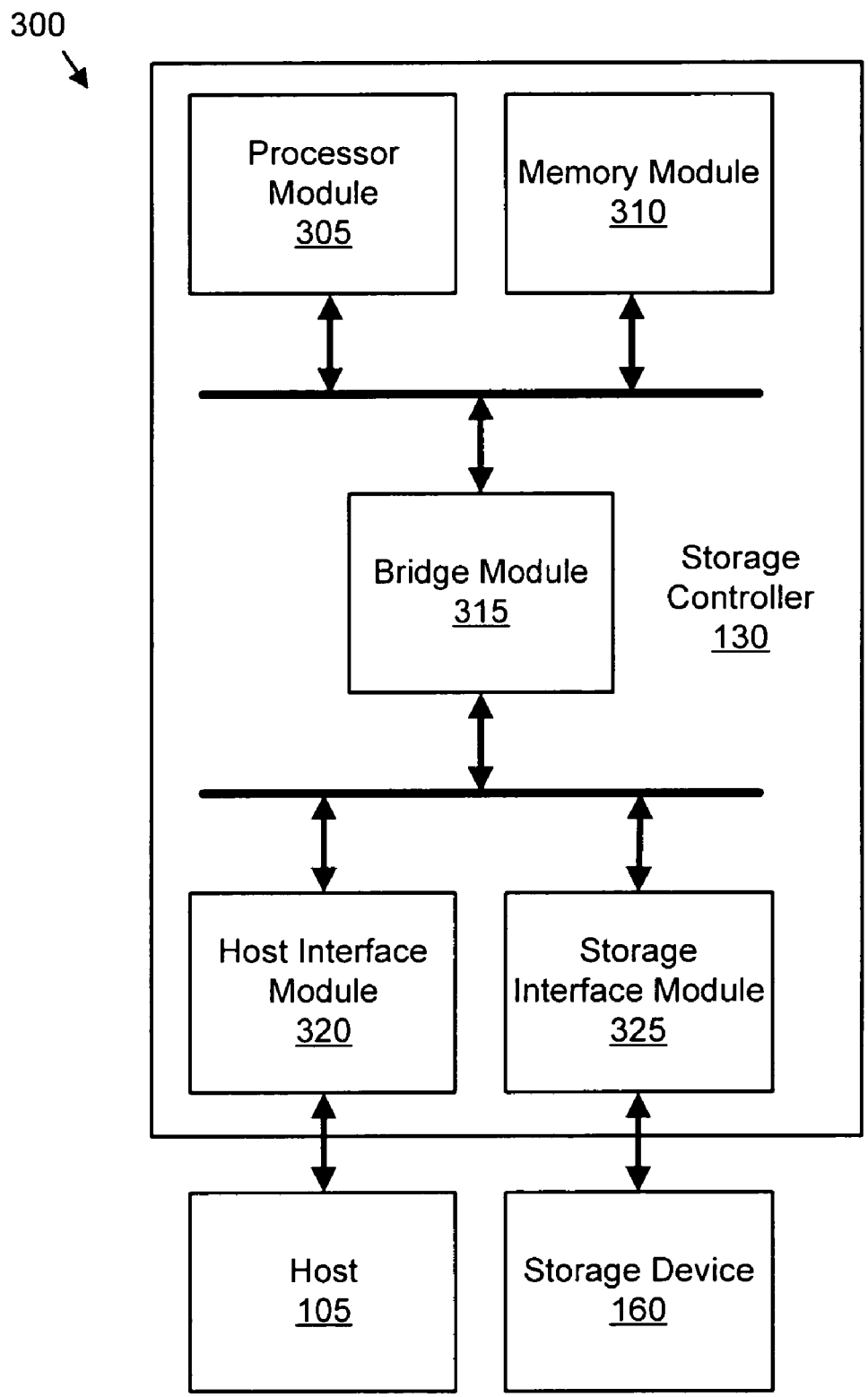
FIG. 3 is a schematic block diagram illustrating one embodiment of a storage controller system of the present invention.

FIG. 3 is a schematic block diagram illustrating one embodiment of a storage controller system 300 of the present invention comprising the storage controller 130 of FIGS. 1 and 2 and a host 105 and a logical device 170 of FIG. 1. The storage controller 130 includes a processor module 305, a memory module 310, a bridge module 315, a host interface module 320, and a storage interface module 325.

The processor module 305, memory module 310, bridge module 315, host interface module 320, and storage interface module 325 may be fabricated of semiconductor gates on one or more semiconductor substrates. Each semiconductor substrate may be packaged in one or more semiconductor devices mounted on circuit cards. Connections between the processor module 305, the memory module 310, the bridge module 315, the host interface module 320, and the storage interface module 325 may be through semiconductor metal layers, substrate to substrate wiring, or circuit card traces or wires connecting the semiconductor devices.

The memory module 310 stores software instructions and data. The processor module 315 executes the software instructions and manipulates the data as is well know to those skilled in the art. The processor module 305 communicates with the host interface module 320 and the storage interface module 325 through the bridge module 315. In one embodiment, one or more logical devices 170 comprise the storage device 160.

In one embodiment, the request module 215, the response module 220, the connection module 225, the initialization module 245, and the detection module 250 comprise one or more software programs comprising software instructions and data. The processor module 305 may execute the software instructions and process the data to receive a request for a plurality of paths, report each path and the status of each path, and connect the host 105 to a preferred path.

In one embodiment, the host interface module 320 comprises one or more host ports. For example, the host interface module 320 may be configured as an Ethernet interface with one or more Ethernet connections. The address of each host port may be the host port identifier. In one embodiment, the storage interface module 320 comprises one or more storage device 160 ports. For example, the storage interface module 320 may be configured as a Fibre Channel interface with one or more Fibre Channel connections. In an alternate embodiment, the storage interface module may be an enterprise systems connectivity ("ESCON") interface as specified by IBM of Armonk, N.Y.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
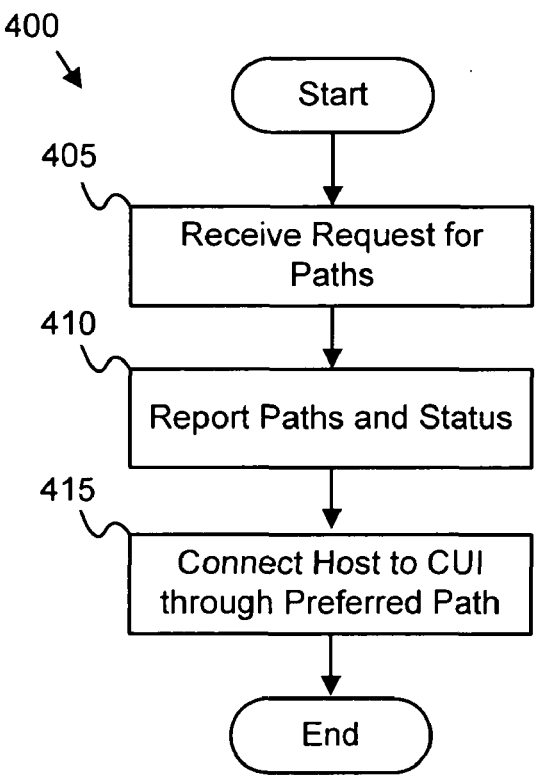
FIG. 4 is a schematic flow chart diagram illustrating one embodiment of a path accessing method of the present invention.

FIG. 4 is a schematic flow chart diagram illustrating one embodiment of a path accessing method 400 of the present invention. A request module 215 such as the request module 215 of FIG. 2 receives 405 a request from a host 105 such as the host 105 of FIG. 1 for a plurality of paths. In one embodiment, the request specifies a path and queries the preference status of the specified path relative to one or more CUIs 135 such as the CUIs 135 of FIG. 1. In an alternate embodiment, the request specifies a CUI 135 and queries the preference status of the specified CUI 135 relative to one or more paths.

A response module 220 such as the response module 220 of FIG. 2 reports 410 each path to a specified CUI 135 and the status of each path to the host 105. In one embodiment, the response module 220 reports 410 a preferred path by reporting 410 the preference status of the specified path. For example, the response module 220 may report 410 that the specified path is a preferred path. Alternatively, the response module 220 may report 410 that the specified path is a non-preferred path. In a certain embodiment, the response module 220 reports 410 the availability of the specified path. For example, the response module 220 may report 410 that the specified path is available for communication. Alternatively, the response module 410 may report that the specified path is unavailable for communication.

In an alternate embodiment, the response module 220 reports 410 the preferred path by specifying one or more preferred paths to the CUI 135. For example, the response module 220 may report 410 a host port identifier wherein the host port identifier specifies the preferred path. In addition, the response module 220 may report 410 the availability of the preferred path. For example, the response module 220 may report 410 that the host port identifier of the preferred path and the availability of the preferred path.

A connection module 225 such as the connection module 225 of FIG. 2 connects 415 the host 105 through the preferred path to the CUI 135. In one embodiment, the host 105 specifies the preferred path to the connection module 225 in response to the report of the response module 220. In an alternate embodiment, the connection module 225 connects 415 the host 105 through the preferred path to the CUI 135 in response to the response module 220 reporting 410 the preferred path. The method 400 supports accessing the CUI 135 through a preferred path, improving the performance of communications between the host 105 and the CUI 135.

Figure 5:
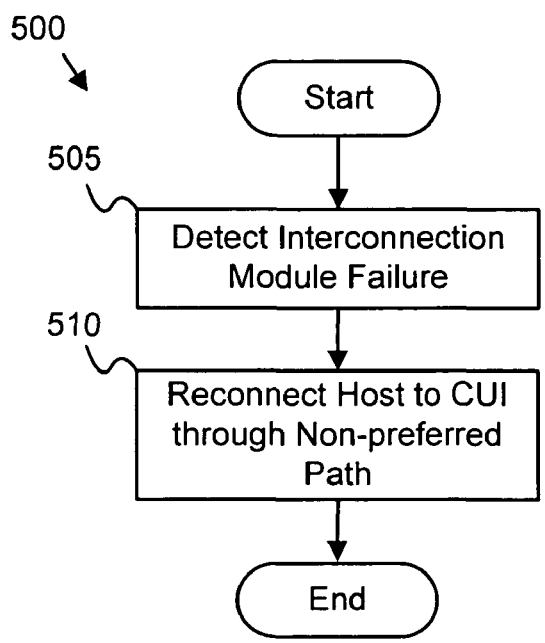
FIG. 5 is a schematic flow chart diagram illustrating one embodiment of a path re-connection method of the present invention.

FIG. 5 is a schematic flow chart diagram illustrating one embodiment of a path re-connection method 500 of the present invention. A detection module 250 such as the detection module 250 of FIG. 2 detects 505 a failure of a first interconnection module 110a such as the first interconnection module of FIG. 1. The first interconnection module 110a may comprise a preferred path between a host 105 and a CUI 135 such as the host 105 and CUI 135 of FIG. 1. For example, a first host 105a may communicate with a first CUI 135a through a preferred path comprising a host port of first interconnection module 110a. The failure of the first interconnection module 110a makes the preferred path unavailable for communication between the first host 105a and the first CUI 135a. In one embodiment, a storage controller 130 such as the storage controller of FIG. 1 notifies the detection module 250 of the failure. In an alternate embodiment, the detection module 250 detects 505 the failure by querying the first interconnection module 110a.

A connection module 225 such as the connection module 225 of FIG. 2 may re-connect 510 the host 105 to the CUI 135 through a non-preferred path in response to the failure of the first interconnection module 110a. For example, the connection module 225 may re-connect 510 the first host 105a to the first CUI 135a through the second interconnection module 110b and the internal communication channel 165 of FIG. 1. The method 500 supports continued communication between the host 105 and the CUI 135 if the interconnection module 110 of a preferred path fails.

Figure 6:
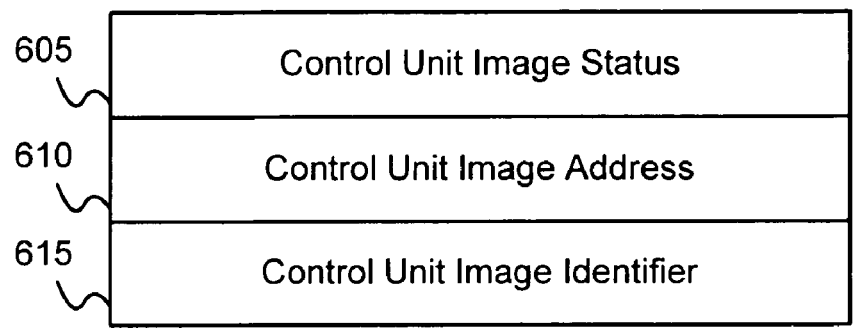
FIG. 6 is a schematic block diagram illustrating one embodiment of a control unit image report of the present invention.

FIG. 6 is a schematic block diagram illustrating one embodiment of a CUI report 600 of the present invention. The report 600 as depicted represents a plurality of digital data words organized as fields that may be transmitted as electrical, wireless, or optical signals. As depicted, the report 600 includes a CUI status field 605, a CUI address field 610, and a CUI identifier field 615. Although the fields 605, 610, 615 are depicted as being of equal length, each field 605, 610, 615 may contain any number of data bits.

The CUI status field 605 identifies the status of a specified path to a CUI 135 such as the CUI 135 of FIG. 1. In one embodiment, the CUI path status field 605 encodes one or more specified status values as binary numbers. The specified status values may include but are not limited to 1) the CUI 135 is not configured; 2) the specified path is not available; 3) the specified path is preferred and available; 4) the specified path is available and all paths are preferred; and 5) the specified path is available and non-preferred.

The CUI address field 610 may include a logical address used by a host 105 such as the host 105 of FIG. 1 to identify the CUI 135. In one embodiment, the CUI identifier field 615 specifies the CUI 135 with a storage controller 130 such as the storage controller 130 of FIG. 1. In one embodiment, a response module 220 such as the response module 220 of FIG. 2 reports 410 the depicted report 600 to the host 105.

Figure 7:
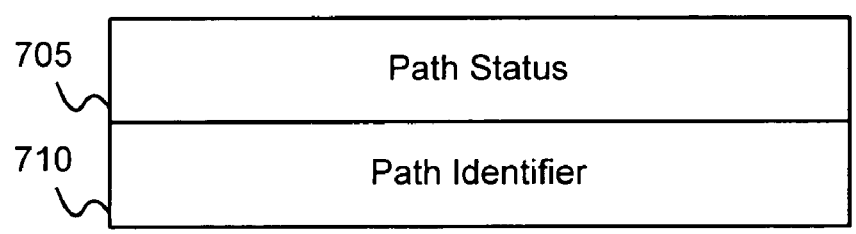
FIG. 7 is a schematic block diagram illustrating one embodiment of a path report of the present invention.

FIG. 7 is a schematic block diagram illustrating one embodiment of a path report 700 of the present invention. The report 700 is a plurality of digital data words organized as fields that may be transmitted as electrical, wireless, or optical signals. A response module 220 such as the response module 220 of FIG. 2 may report 410 the path report 700 to a host 105 such as the host 105 of FIG. 1. The path report 700 includes a path status field 605 and a path identifier field 610. Although the fields 705, 710 are depicted as being of equal length, each field 705, 710 may contain any number of data bits.

In one embodiment, the path status field 705 identifies a path such as a path between the host 105 and a logical device 170 such as the logical device 170 of FIG. 1 as preferred or non-preferred. The path status field 705 may also identify the path as available or un-available.

In one embodiment, the path identifier 710 identifies a unique path with a storage controller 130 such as the storage controller 130 of FIG. 1. In one embodiment, the path identifier may include a host port identifier.

The present invention is the first to identify a plurality of paths including a preferred path from a host 105 to a CUI 135 in response to a host request. In addition, the present invention connects the host 105 to the CUI 135 through the preferred path. The present invention improves the performance of communication between the host 105 and the CUI 135 by allowing the host 105 to access the CUI 135 through the preferred path. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to access a path through a storage controller, the apparatus comprising:
    a plurality of host ports each configured to communicate with a host via a respective one of a plurality of host communication channels between the host and the host ports, wherein input/output (I/O) requests from the host are directed through a selected one of the plurality of host communication channels;
    a request module configured to receive a path identification request from the host to identify a plurality of paths from the host to a selected control unit image of a plurality of control unit images of the storage controller, each path comprising one of the plurality of host communication channels and at least one of a plurality of redundant interconnection modules of the storage controller, wherein a first path of the plurality of paths comprises a first host communication channel of the plurality of host communication channels and a first redundant interconnection module of the plurality of redundant interconnection modules, the first redundant interconnection module comprising the selected control unit image, and a second path of the plurality of paths comprises a second host communication channel of the plurality of host communication channels, the first redundant interconnection module, a second redundant interconnection module of the plurality of redundant interconnection modules, and an internal communication channel of the storage controller between the first and second redundant interconnection modules, the internal communication channel facilitating the communication of I/O requests from the host between the first and second redundant interconnection modules, and wherein each of the plurality of control unit images comprises a virtual module emulated by the storage controller, each control unit image comprising a management group of at least one logical device, the at least one logical device being configured to emulate a storage device;
    a response module configured to report the first and second paths, the status of the first and second paths relative to the control unit image, and an identifier of the first and second paths to the host, the response module being configured to designate the first path as a preferred path and the second path as a non-preferred path, wherein the designation of the first and second paths as one of preferred and non-preferred is based on which of the first and second redundant interconnection modules comprises the selected control unit image and which of the first and second host communication channels places the host in more direct communication with the selected control unit image; and
    a connection module configured to direct I/O requests from the host to the selected control unit image through the preferred path if the first redundant interconnection module is operable and through the non-preferred path if the first redundant interconnection module is inoperable.

2. The apparatus of claim 1, wherein the connection module is further configured to dynamically reconnect the host to the control unit image through a path.

3. The apparatus of claim 1, wherein each redundant interconnection module is configured with at least two of the plurality of host ports and a plurality of storage device ports.

4. The apparatus of claim 3, wherein each redundant interconnection module is in communication through an internal communication channel with at least one other redundant interconnection module and the host port of the first redundant interconnection module is configured to communicate through the first redundant interconnection module and the internal communication channel with a logical device of the control unit image managed by the second redundant interconnection module.

5. The apparatus of claim 1, further comprising a detection module configured to detect a failure of the first redundant interconnection module and wherein the connection module is configured to connect the host through the non-preferred path in response to the detected failure.

6. The apparatus of claim 1, further comprising an initialization module configured to identify preferred, non-preferred, and unavailable paths for each control unit image upon initialization of a storage controller.

7. A system to access a path, the system comprising:
    a host device;
    a storage controller comprising:
    a plurality of host ports each configured to communicate with the host device via a respective one of a plurality of host communication channels between the host device and the host ports, wherein input/output (I/O) requests from the host device are directed through a selected one of the plurality of host communication channels;
    a plurality of control unit images each comprising at least one logical device;
    a plurality of redundant interconnection modules configured to connect the host device to a selected control unit image of the plurality of control unit images through at least a first and second path of a plurality of paths, the first path comprising a first host communication channel of the plurality of host communication channels and a first redundant interconnection module of the plurality of redundant interconnection modules, the first redundant interconnection module comprising the selected control unit image, and the second path comprising a second host communication channel of the plurality of host communication channels, the first redundant interconnection module, a second redundant interconnection module of the plurality of redundant interconnection modules, and an internal communication channel of the storage controller between the first and second redundant interconnection modules, wherein the internal communication channel facilitates the communication of I/O requests from the host device between the first and second redundant interconnection modules;

a request module configured to receive a path identification request from the host device to identify the plurality of paths from the host device to the selected control unit image;

a response module configured to report the first and second paths, the status of the first and second paths relative to the selected control unit image, and an identifier of the first and second paths to the host device, the response module being further configured to designate the first path as a preferred path and the second path as a non-preferred path, wherein the designation of the first and second paths as one of preferred and non-preferred is based on which of the first and second redundant interconnection modules comprises the selected control unit image and which of the first and second host communication channels places the host device in more direct communication with the selected control unit image; and a connection module configured to direct I/O requests from the host device to the selected control unit image through the preferred path if the first redundant interconnection module has not failed and through the non-preferred path if the first redundant interconnection module has failed.

8. The system of claim 7, wherein the connection module is further configured to dynamically reconnect the host device to the control unit image through a path.

9. The system of claim 7, wherein each redundant interconnection module is configured with at least two of the plurality of host ports and a plurality of storage device ports.

10. The system of claim 9, wherein each redundant interconnection module is in communication through an internal communication channel with at least one other redundant interconnection module and the host port of the first redundant interconnection module is configured to communicate through the first redundant interconnection module and the internal communication channel with at least one logical device of the control unit image managed by the second redundant interconnection module.

11. The system of claim 7, wherein at least one logical device is emulated using storage capacity from a portion of at least one storage device.

12. The system of claim 7, further comprising a detection module configure to detect a failure of the first redundant interconnection module.

13. The system of claim 7, further comprising an initialization module configured to identify preferred, non-preferred, available and unavailable paths for each control unit image upon initialization of the storage controller prior to receiving an I/O request from the host device.

14. A non-transitory computer readable storage medium tangibly embodying a program of machine-readable instructions executable by a digital processing apparatus to perform operations to access a path, the operations comprising:

receiving a path identification request from a host to identify a plurality of paths from the host to a selected control unit image through a storage controller configured with a plurality of redundant interconnection modules configured to connect the host to the selected control unit image through at least a first and second path, the first path comprising a first host communication channel between the host and the storage controller and a first redundant interconnection module of the plurality of redundant interconnection modules, the first redundant interconnection module comprising the selected control unit image, and the second path comprising a second host communication channel between the host and the storage controller, the first redundant interconnection module, a second redundant interconnection module of the plurality of redundant interconnection modules, and an internal communication channel of the storage controller between the first and second redundant interconnection modules, wherein the internal communication channel facilitates the communication of I/O requests from the host between the first and second redundant interconnection modules;

reporting to the host the first and second paths, the status of the first and second paths relative to the selected control unit image as one of preferred and non-preferred, and an identifier of the first and second paths, wherein the status of the first path is a preferred path and the status of the second path is a non-preferred path, and wherein the status of the first and second paths as one of preferred and non-preferred is based on which of the first and second redundant interconnection modules comprises the selected control unit image and which of the first and second host communication channels places the host in more direct communication with the selected control unit image; and directing I/O requests from the host to the selected control unit image through the preferred path if the first redundant interconnection module is operable and through the non-preferred path if the first redundant interconnection module is inoperable.

15. The non-transitory computer readable storage medium of claim 14, wherein the instructions further comprise operations to dynamically reconnect the host to the control unit image through a path.

16. The non-transitory computer readable storage medium of claim 14, wherein each redundant interconnection module is configured with at least two of the plurality of host ports and a plurality of logical devices.

17. The non-transitory computer readable storage medium of claim 16, wherein each redundant interconnection module is in communication through an internal communication channel with at least one other redundant interconnection module and the host port of the first redundant interconnection module is configured to communicate through the first redundant interconnection module and the internal communication channel with a logical device of the control unit image managed by the second redundant interconnection module.

18. The non-transitory computer readable storage medium of claim 14, wherein the selected control unit image comprises at least one logical device, the at least one logical device being emulated using storage capacity from a portion of at least one storage device.

19. The non-transitory computer readable storage medium of claim 14, the instructions further comprising operations to connect the host through the non-preferred path if the first redundant interconnection module fails.

20. The non-transitory computer readable storage medium of claim 14, wherein the instructions further comprise operations to identify preferred, non-preferred, and unavailable paths for the selected control unit image upon initialization of the storage controller.

* * * * *